(12) United States Patent
Adamek et al.

(10) Patent No.: US 6,868,947 B2
(45) Date of Patent: Mar. 22, 2005

(54) PISTON FOR A HYDRAULIC DASHPOT, AND METHOD OF MANUFACTURING SUCH A PISTON

(75) Inventors: Jürgen Adamek, Ennepetal (DE); Thomas Sasse, Ennepetal (DE); Manfred Diederich, Bereborn (DE); Axel Gaillard, Breckerfeld (DE); Heribert Justinger, Kell am See (DE); Alfred Mathony, Trier (DE); Christian Satzek, Wuppertal (DE); Stefan Schwindling, Kell am See (DE); Bernd Stichler, Ludwigsburg (DE)

(73) Assignee: Krupp Bilstein GmbH, Ennepetal (DE)

( * ) Notice: Subject to any disclaimer, the term of this patent is extended or adjusted under 35 U.S.C. 154(b) by 191 days.

(21) Appl. No.: 09/981,086

(22) Filed: Oct. 16, 2001

(65) Prior Publication Data

US 2002/0070085 A1 Jun. 13, 2002

(30) Foreign Application Priority Data

Oct. 20, 2000 (DE) .......................................... 100 51 971

(51) Int. Cl.$^7$ ................................................ F16F 9/00
(52) U.S. Cl. .................................. 188/322.2; 188/282.5
(58) Field of Search ............................ 188/322.2, 282.5

(56) References Cited

U.S. PATENT DOCUMENTS

| | | | | |
|---|---|---|---|---|
| RE16,582 E | * | 4/1927 | Morinelli ..................... | 188/317 |
| 2,888,107 A | * | 5/1959 | De Koning et al. ..... | 188/282.9 |
| 3,548,977 A | * | 12/1970 | Morgan .................... | 188/282.5 |
| 3,625,321 A | * | 12/1971 | Lutz ........................... | 188/298 |
| 3,827,538 A | * | 8/1974 | Morgan .................... | 188/319.1 |
| 4,474,271 A | * | 10/1984 | Molders et al. ............. | 188/280 |
| 4,821,852 A | * | 4/1989 | Yokoya ................. | 188/322.15 |
| 4,830,152 A | * | 5/1989 | Rauert et al. .......... | 188/322.15 |
| 5,259,294 A | * | 11/1993 | May .......................... | 92/181 P |
| 5,547,050 A | * | 8/1996 | Beck ........................ | 188/282.5 |
| 5,823,306 A | * | 10/1998 | de Molina ............. | 188/322.15 |
| 6,039,159 A | * | 3/2000 | Ohlin et al. ........... | 188/322.15 |
| 6,161,662 A | * | 12/2000 | Johnston et al. ......... | 188/282.3 |
| 6,318,523 B1 | * | 11/2001 | Moradmand et al. ........ | 188/280 |
| 6,364,075 B1 | * | 4/2002 | Lemmens et al. ..... | 188/322.22 |
| 6,371,264 B1 | * | 4/2002 | Deferme ................ | 188/322.15 |
| 6,397,987 B1 | * | 6/2002 | Pesch et al. ........... | 188/322.22 |

* cited by examiner

*Primary Examiner*—Robert Siconolfi
(74) *Attorney, Agent, or Firm*—Max Fogiel

(57) ABSTRACT

A piston for a hydraulic dashpot. The piston (1) is mounted on one end of a piston rod (3), travels back and forth inside a cylinder (2), which it divides into two chambers (4 & 5), and has a body (10) provided with axial channels (6 & 7), each of which can be opened and closed at the end by a one-way valve in the form of a cup spring or stack of cup springs (8 & 9), independently adjusting their tensions for both the compression and the suction phases. The cup springs (8 & 9) rest against and in alignment with the body, and the tension is adjusted by deforming the body resiliently or plasticly against its contact surface.

16 Claims, 2 Drawing Sheets

PISTON FOR A HYDRAULIC DASHPOT, AND METHOD OF MANUFACTURING SUCH A PISTON

Figure 1:
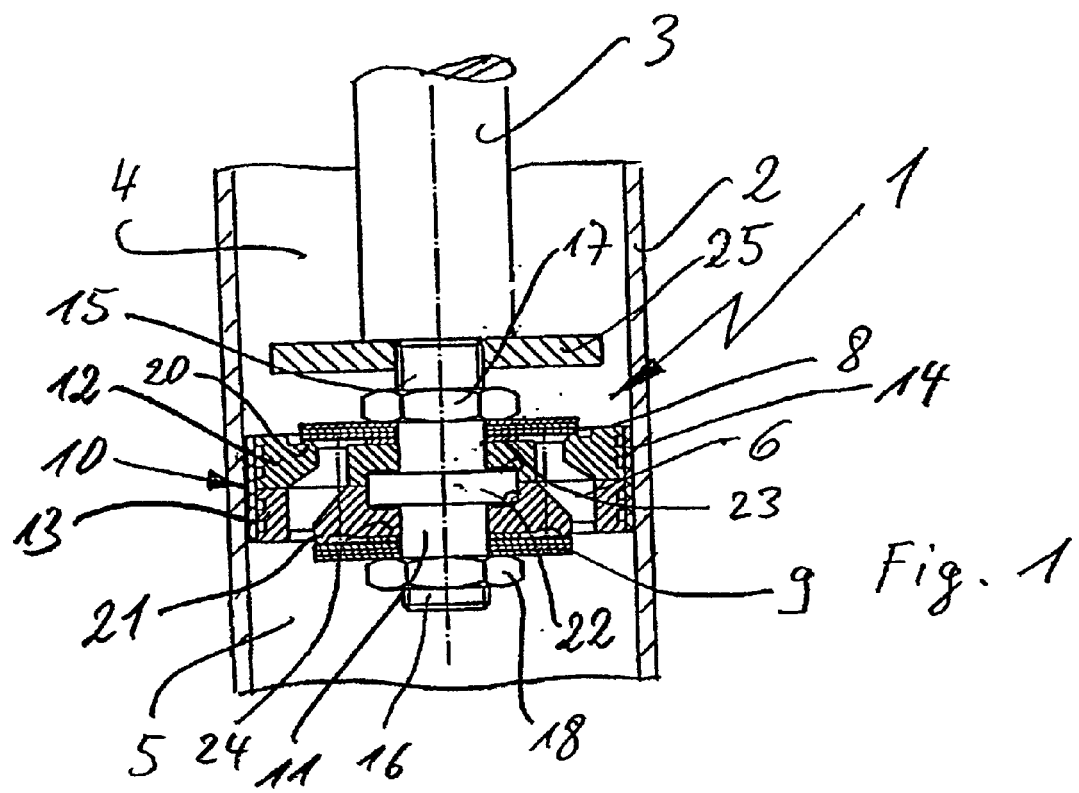

The present invention concerns a piston for a hydraulic dashpot as recited in the preamble of claim 1. The invention also concerns a method of manufacturing such a piston.

Dashpots for motor vehicles are intended to attenuate the vibrations of the spring-suspended wheels, Such dashpots usually include a piston mounted on one end of a piston rod and traveling back and forth inside a cylinder.

A piston of this genus is known from German Patent 969 330. This device includes a one-way valve in the form of a cup spring or stack of cup springs subject to the force of a compression-application mechanism mounted on a threaded bolt. The valve's resilience is adjusted by rotating the compression-application mechanism.

The piston described in the aforesaid patent is accordingly adjustable, but extremely complicated, and must also be manufactured to very precise tolerances.

The object of the present invention is a piston with a valve, particularly a cup spring or stack of cup springs, with aa resilience that can easily be adjusted over a specific range. As in the piston described in German Patent 969 330, moreover, the resilience in the suction phase will be adjustable independently of the resilience in the compression phase and vice versa.

This object is attained in accordance with the present invention by the characteristics recited in the body of Claim 1. Advantageous further and advanced embodiments of the invention are addressed by Claims 2 through 10.

Claims 11 through 13 recite a method of manufacturing such a piston, and Claim 15 recites an advantageous way of attaching the piston to a piston rod.

The present invention has several advantages. Although the piston is simple, it can easily be employed to precisely vary the hydraulic impedances of both the compression phase and the suction phase. The tolerances involved in manufacturing the piston can accordingly easily be attained. The piston's characteristic curve can also be easily adjusted in both the compression and the suction phase. Finally, the piston can be produced simply and cost-effectively.

The present invention will now be specified with reference to the drawing, wherein FIGS. 1 through 4 are sections through different embodiments of a piston in accordance with the present invention and illustrate different approaches to its manufacture.

A piston 1 is conventionally mounted on one end of a piston rod 3 and travels back and forth inside a cylinder 2. Although the piston in the present embodiment is screwed onto the piston rod, other means of attachment are also possible.

Cylinder 2 is full of hydraulic fluid and is divided by piston 1 into two chambers 4 and 5. Piston 1 is provided with channels 6 and 7, each of which can be opened and closed by one-way valves in the form of stacks of cup springs, channel 6 by cup springs 8 and channel 7 by cup springs 9. The body 10 of piston 1 is in three parts, specifically a bolt 11 and two halves 12 and 13. Piston 1 is wrapped around by a binding 14 in the form of a band of low-friction plastic. Bolt 11 is provided with threads 15 at one and threads 16 at the other. The components of piston 1 are held together by nuts 17 and 18 at each end and by a washers 19. Cup springs 8 and 9 are in direct alignment with the body 10, and hence with the halves 12 and 13, of piston 1. Cup springs 8 and 8 can be tensioned against body 10 by rotating nuts 17 and 18 and washer 19, axially deforming halves 12 and 13 between the cup springs resiliently or even plasticly. This action requires the circumference of cup springs 8 and 9 to rest snug against outer annular sealing edges 20 and 21 on body 10. The tension applied by cup springs 8 and 9 can accordingly be varied.

The piston 1 illustrated in FIG. 1 is provided with a bolt 11 surrounded by a collar 22. Collar 22 rests in depressions in halves 12 and 13 and is accordingly accommodated in them both axially and radially. Any tolerances or intentional play left between collar 22 and halves 12 and 13 can be compensated by a applying a hardening casting mass, achieving an especially axially solid attachment between the halves and the collar. The surfaces of contact between cup springs 8 and 9 are established by compression disks 23 and 24, facilitating the desired resilient or plastic deformation by way of prescribed screwing forces.

The upper threads 15 on bolt 11 are welded into a shock-accommodating disk 25, fastening piston 1 to piston rod 3 and allowing adjustment of cup springs 8 and 9 to both the compression and suction phases by rotating nuts 17 and 18.

Figure 2:
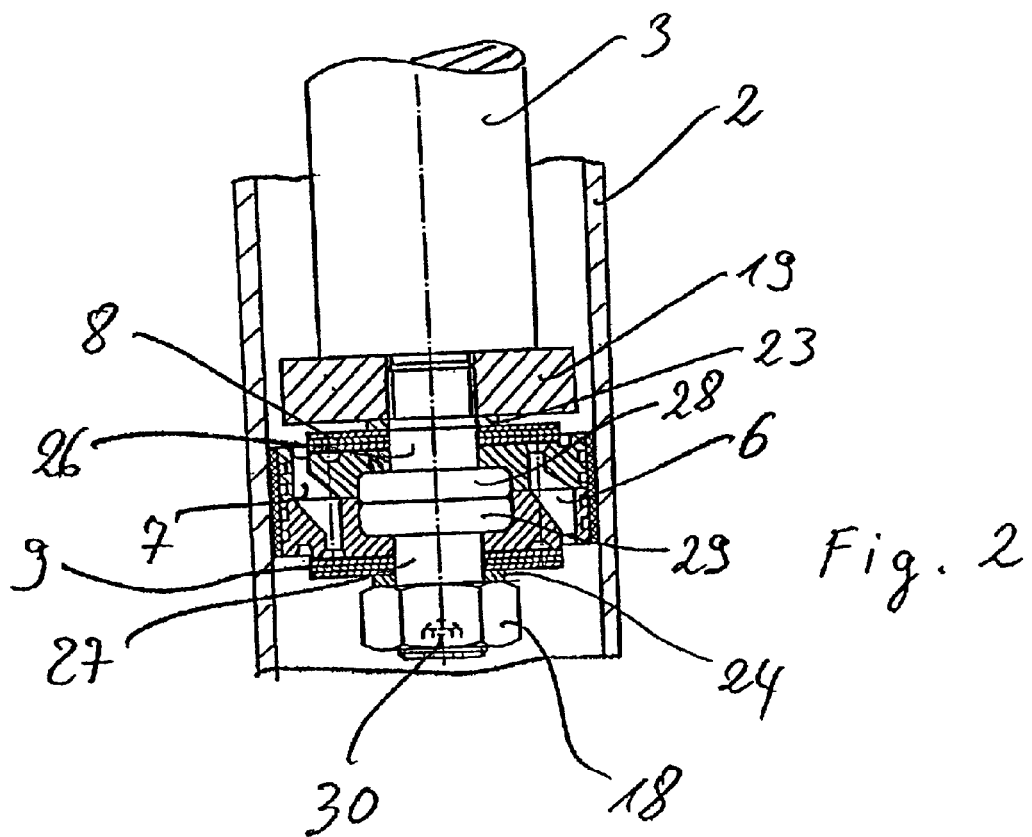

The bolt 11 in the embodiment illustrated in FIG. 2 is composed of two halves 26 and 27 originally provided with heads 28 and 29. The two halves are positioned with their heads together and for example welded, creating collar 22, subsequent to which bolt 11 can be further fastened together as specified with reference to FIG. 1. Halves 26 and 27 can, however, alternatively be cemented together along with their heads. Piston 1 is fastened to piston rod 3 as specified with reference to FIG. 1 except that the shock accommodation is provided by washer 19, which simultaneously applies tension to upper cup springs 8. The head of bolt 11 is provided with a hexagonal recess 30 instead of a nut. Upper cup springs 8 can be tightened and tensioned as specified with reference to FIG. 1 by means of nut 18 once upper cup springs 8 have been appropriately adjusted.

Figure 3:
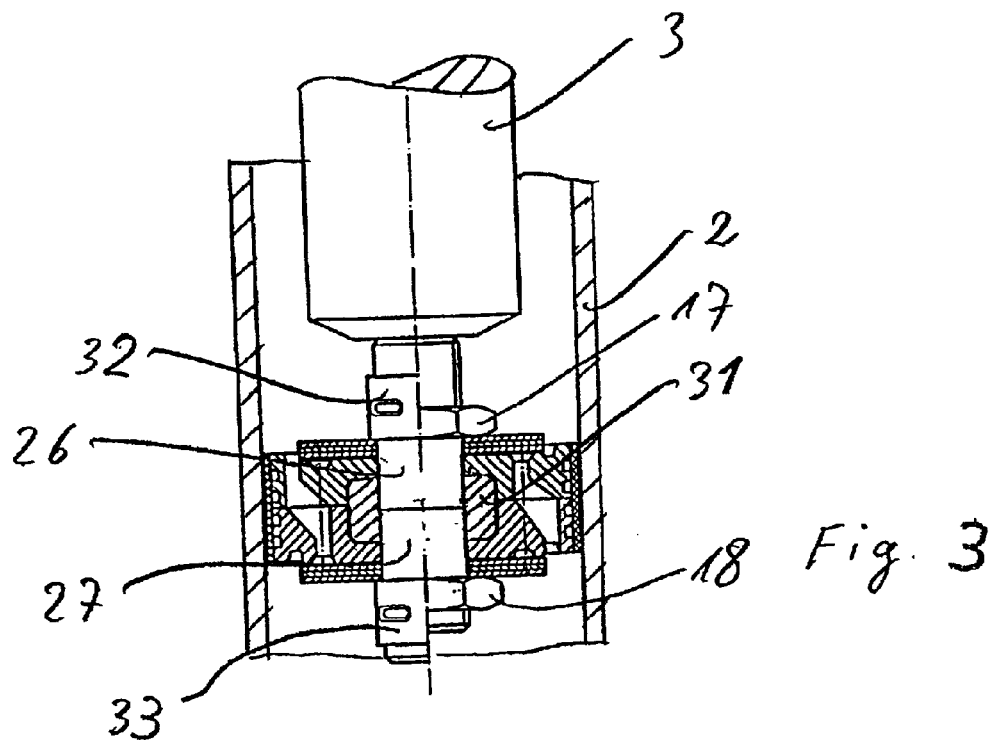

The facing surfaces of the piston halves 12 and 13 in the embodiment illustrated in FIG. 3 are provided with depressions 31. In this embodiment as well, halves 26 and 27 the two halves are cylindrical, at least in the vicinity of body 10. Body 10 is designed to allow the halves to be fastened together by burn-off butt welding for example, creating an outward-directed welding bead that fills depressions 31. Halves 26 and 27 and depressions 31 are relatively dimensioned to ensure that the bead will entirely occupy the depressions. Cup springs 8 and 9 can be tensioned by clamp connections 32 and 33, by welding, or by nuts 17 and 16.

To facilitate positioning and securing piston halves 12 and 13 in relation to collar 22 or heads 28 and 29, the surfaces of depressions 31 can be provided with knife-like radial or axial elevations 31a that dig into collar 22 or heads 28 and 29. With piston halves 12 and 13 appropriately oriented in relation to piston rod 3 and to bolt 11 or halves 26 and 27 accordingly, the arrangement will be stable both axially and radially no matter how the system is finally assembled. Heads 28 and 29 and collar 22 may have a polygonal surrounding surface.

Figure 4:
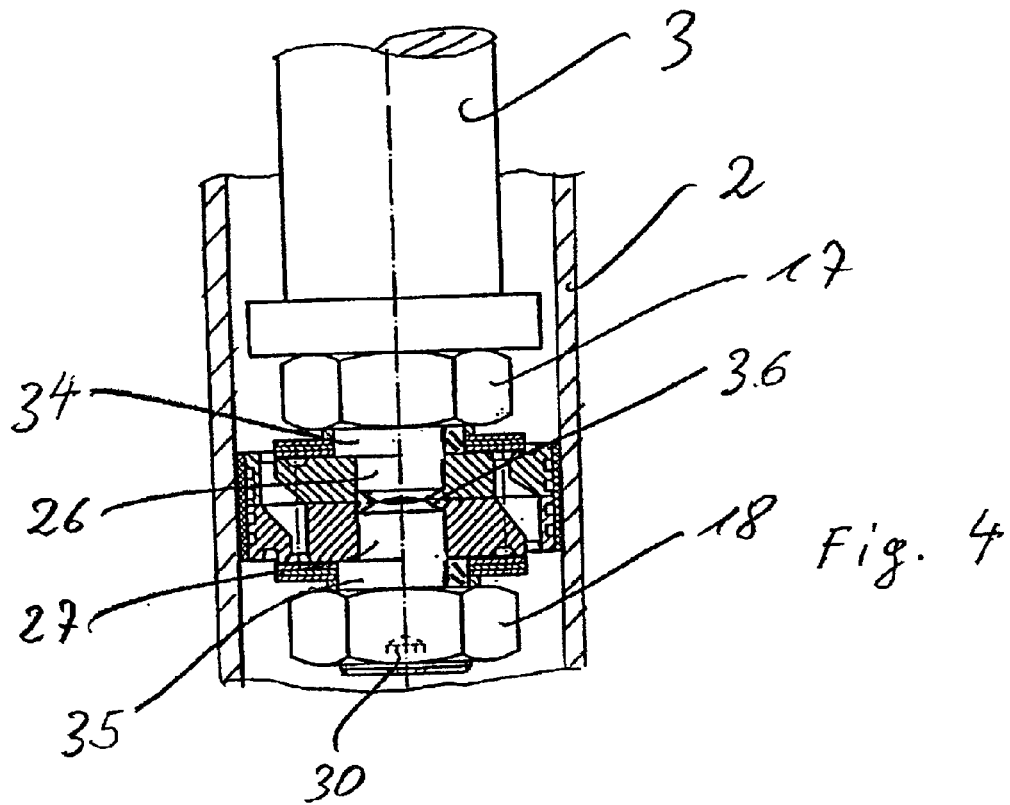

The piston halves 12 and 13 and bolt 11 in the two versions of the embodiment illustrated in FIG. 4 can be fastened together in various ways. The bolts in both versions are composed of two halves 26 and 27 welded together inside piston halves 12 and 13. The bolt halves in the version represented in the left half of the figure are provided with collars 34 and 35 that, once the bolt halves have been connected, rest against the faces of the piston halves. All the components of body 10 are accordingly assembled together.

The mutually contacting surfaces of the piston halves 12 and 13 in the version represented in the right half of FIG. 4 are provided with inwardly projecting noses 36. Once the halves 26 and 27 in this version have been welded together to create bolt 11, again cylindrical in the vicinity of body 10, the overall assembly will be stable.

The surrounding surface of either the collar 22 or the heads 28 and 29 of the bolt halves 26 and 27 need not be round, but they are preferably polygonal and fit into matching recesses in the piston halves 12 and 13.

The piston halves 12 and 13 have round and/or radial and preferably knife-like elevations on the faces of the depressions 31 in the piston halves 12 and 13.

LIST OF PART 1. piston
2. cylinder
3. piston rod
4. chamber
5. chamber
6. channel
7. channel
8. upper cup springs
9. lower cup springs
10. body
11. bolt
12. half
13. half
14. binding
15. threads
16. threads
17. nut
18. nut
19. washer
20. sealing edge
21. sealing edge
22. collar
23. compression disk
24. compression disk
25. Shock-accommodating disk
26. upper bolt half
27. lower bolt half
28. head
29. head
30. Hexagonal recess
31. depression
32. clamp connection
33. clamp connection
34. collar
35. collar
36. nose

What is claimed is:

1. A piston for a hydraulic dashpot, comprising: a piston head mounted on one end of a piston rod traveling back and forth inside a cylinder divided into two chambers; said piston head having axial channels, each of said channels being openable and closable at an end by a one-way valve in form of cup spring means; means for independently adjusting tensions of said cup spring means for both compression and suction phases, said cup spring means resting against said piston head and aligned with said piston head, said tensions being adjusted by deforming said cup spring means resiliently or plasticly against a contact surface of said piston head for varying hydraulic impedances of said compression and suction phases; said piston having a characteristic curve adjustable in both compression and suction phases, said piston head comprising a central bolt having a continuous collar; and two piston halves resting axially against the collar; said bolt being fixed to said collar; said collar having two faces abutted by said two piston halves; said piston halves having to be pushed over said bolt from opposite ends of said bolt in mounting said piston halves on said bolt so that said bolt is fastenable only thereafter to said piston rod.

2. A piston as defined in claim 1, wherein said piston head comprises a plurality of parts.

3. A piston as defined in claim 1, wherein said piston halves are of sintered metal.

4. A piston as defined in claim 1, including means for applying said tension and comprising a screw-tight mechanism having nuts operating in conjunction with threads extending around said bolt.

5. A piston as defined in claim 1, wherein said collar and heads of said bolt have a polygonal surrounding surface fitting into matching recesses in said piston halves.

6. A piston as defined in claim 1, including elevations on faces of depressions in said piston halves.

7. A piston as defined in claim 1, including mutually engaging elevations and depressions in inner adjacent faces of said piston halves.

8. A piston as defined in claim 1, wherein said bolt comprises two halves, each of said bolt half having a head fastened to the collar.

9. A piston as defined in claim 1, wherein said bolt comprises two bolt halves fastened to said piston halves.

10. A piston as defined in claim 1, wherein said bolt is welded to said piston rod.

11. A piston as defined in claim 1, wherein said bolt is welded to a washer.

12. A piston as defined in claim 1, wherein said bolt is welded to a shock absorbing disk.

13. A piston for a hydraulic dashpot, comprising: a piston head mounted on one end of a piston rod traveling back and forth inside a cylinder divided into two chambers; said piston head having axial channels, each of said channels being openable and closable at an end by a one-way valve in form of cup spring means; means for independently adjusting tensions of said cup spring means for both compression and suction phases, said cup spring means resting against said piston head and aligned with said piston head, said tensions being adjusted by deforming said cup spring means resiliently or plasticly against a contact surface of said piston head for varying hydraulic impedances of said compression and suction phases; said piston having a characteristic curve adjustable in both compression and suction phases; said piston head comprising a plurality of parts; said piston head comprising a central bolt having ends with a continuous collar at each end, two piston halves resting axially against said collar at each end, said piston halves being of sintered metal, means for applying said tension and comprising a screw-tight mechanism having nuts operating in conjunction with threads extending around said bolt, said collar and heads of said bolt having a polygonal surrounding surface fitting into matching recesses in said piston halves, elevations on faces of depressions in said piston halves, mutually engaging elevations and depressions in inner adjacent faces of said piston halves, said bolt comprising two halves welded together and said collar comprising a bead left from said welding, said bolt being welded to said piston rod.

14. A piston for a hydraulic dashpot, comprising: a piston head mounted on one end of a piston rod traveling back and forth inside a cylinder divided into two chambers; said piston head having axial channels, each of said channels being openable and closable at an end by a one-way valve in form of cup spring means; means for independently adjusting tensions of said cup spring means for both compression and suction phases, said cup spring means resting against said piston head and aligned with said piston head, said tensions being adjusted by deforming said cup spring means resiliently or plasticly against a contact surface of said piston head for varying hydraulic impedances of said compression and suction phases; said piston having a characteristic curve adjustable in both compression and suction phases, said piston head comprising a central bolt having two axially separated continuous collars, said piston head having piston halves positioned between said collars; said bolt being fixed to said collars.

15. A piston as defined in claim 14, wherein said bolt comprises two halves welded together and said collar comprises a bead left from said welding.

16. A piston for a hydraulic dashpot, comprising: a piston head mounted on one end of a piston rod traveling back and forth inside a cylinder divided into two chambers; said piston head having axial channels, each of said channels being openable and closable at an end by a one-way valve in form of cup spring means; means for independently adjusting tensions of said cup spring means for both compression and suction phases, said cup spring means resting against said piston head and aligned with said piston head, said tensions being adjusted by deforming said cup spring means resiliently or plasticly against a contact surface of said piston head for varying hydraulic impedances of said compression and suction phases; said piston having a characteristic curve adjustable in both compression and suction phases, said piston head comprising a central bolt having a continuous groove and two piston halves, said groove being engaged by two nose members.

* * * * *